United States Patent [19]
Rykowski et al.

[11] Patent Number: 5,934,795
[45] Date of Patent: Aug. 10, 1999

[54] LENS DESIGN FOR OUTDOOR SIGN

[75] Inventors: Ronald F. Rykowski, Woodinville, Wash.; Richard E. Albrecht, Durham, N.C.

[73] Assignee: Radiant Imaging, Inc., Duvall, Wash.

[21] Appl. No.: 08/665,889

[22] Filed: Jun. 19, 1996

[51] Int. Cl.$^6$ ...................................................... F21V 13/04
[52] U.S. Cl. .......................................... 362/309; 362/328
[58] Field of Search ..................................... 362/308, 309, 362/328–330, 333, 334, 336–340

[56] References Cited

U.S. PATENT DOCUMENTS

| | | | |
|---|---|---|---|
| 1,174,470 | 3/1916 | Beuttell | 362/309 |
| 1,671,313 | 5/1928 | Poser . | |
| 1,788,936 | 1/1931 | Wood | 362/333 |
| 1,955,597 | 4/1934 | Lamblin-Parent | 362/41.3 |
| 2,551,954 | 5/1951 | Lehman | 362/333 |
| 2,853,599 | 9/1958 | Kliegl | 362/106.1 |
| 4,473,872 | 9/1984 | Puckett et al. | 362/309 |
| 4,930,051 | 5/1990 | Golz | 362/309 |

*Primary Examiner*—Alan Cariaso
*Attorney, Agent, or Firm*—Dorr, Carson, Sloan & Birney, P.C.

[57] ABSTRACT

The present invention comprises a lighting unit having a light source emitting light, a reflector placed behind the light source for reflecting the emitted light, and a lens held in front of the light source. The lens is substantially flat and circular. The lens has a predetermined structure that comprises a light-emitting surface and a light-incident surface opposing the light-emitting surface. The light-incident surface of the lens is formed into a vertically oriented high-frequency waveform. In the first embodiment of the lens, the light-emitting surface is substantially flat and the high-frequency waveform is obtained from a combination of a first primary waveform and the third harmonic of the first primary waveform; that is, the high-frequency waveform is derived from the equation $$y = 0.02\left[\sin\left(\frac{2\pi x}{0.09}\right) + 0.035\sin\left(\frac{6\pi x}{0.09}\right)\right].$$

The first embodiment of the lens spreads the emitted light with a graduated distribution horizontally about 20 degrees as measured from the edge of the lens. In the second embodiment of the lens, the light-emitting surface is formed into a vertically oriented low-frequency waveform derived from the equation $$y = 0.0010\sin\left(\frac{2\pi x}{0.025}\right).$$

The light-incident surface is formed into a vertically oriented high-frequency waveform obtained from a combination of a second primary waveform and the third and fifth harmonics of the second primary waveform. That is, the high-frequency waveform of the second embodiment is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

The second lens embodiment spreads the emitted light with a graduated distribution horizontally about 45 degrees as measured from the edge of the lens.

50 Claims, 5 Drawing Sheets

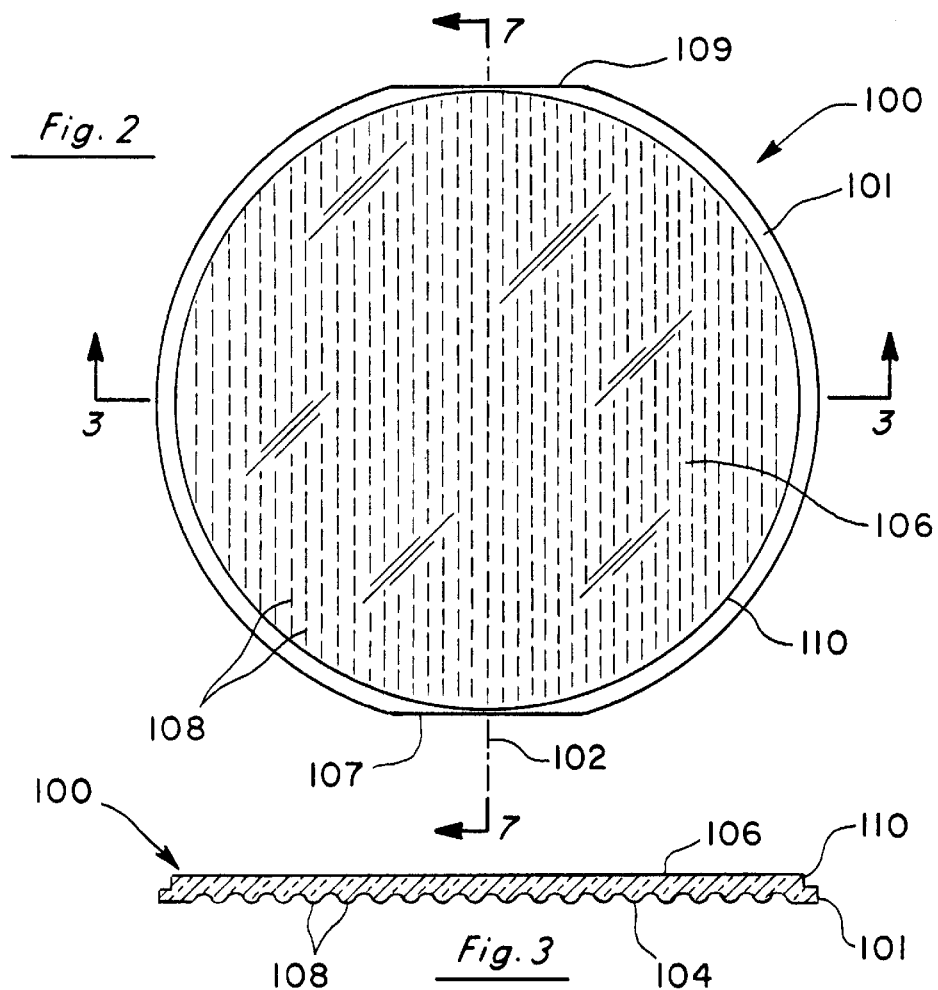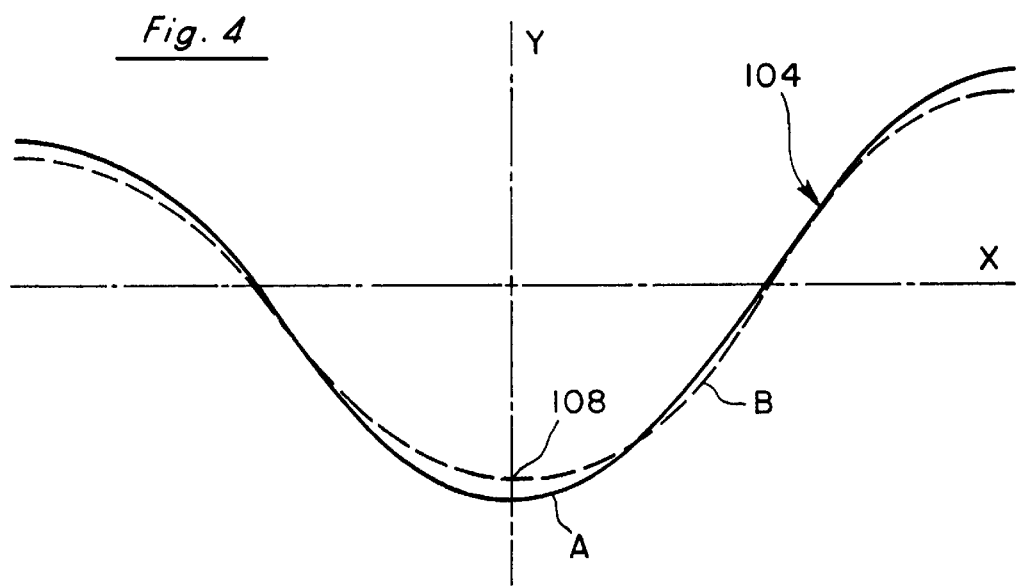

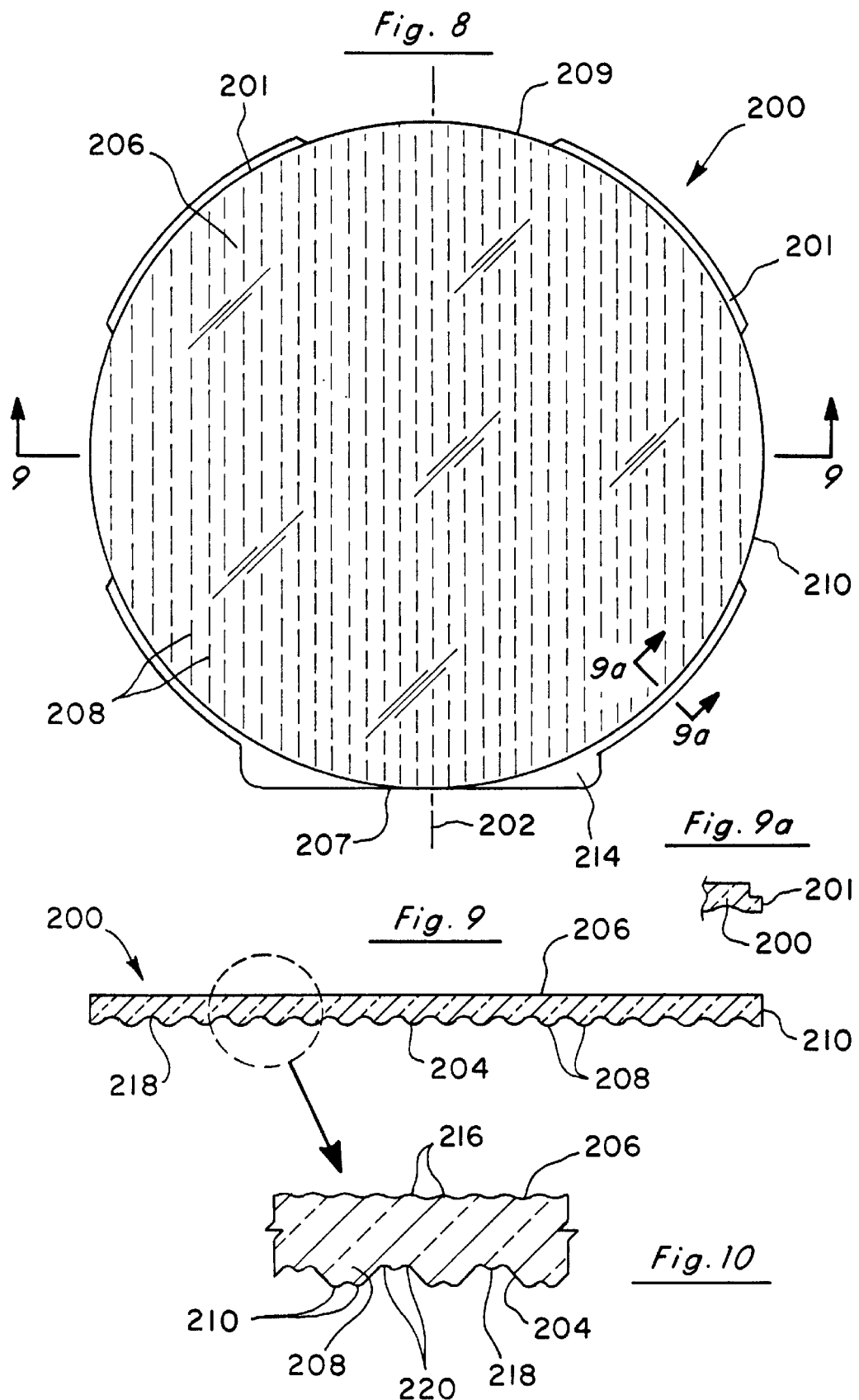

LENS DESIGN FOR OUTDOOR SIGN

BACKGROUND OF THE INVENTION

1. Field of the Invention

The present invention relates, in general, to a lighting unit having an incandescent bulb for an outdoor visual display sign, and, more particularly, to a lens for the lighting unit that provides a graduated horizontal distribution of the emitted light.

2. Statement of the Problem

People have long used outdoor signs for advertising, sending messages to others, and displaying artwork. In early times, carved and painted wooden signs were hung outside of taverns and inns to advertise their presence and accessibility for travelers. In more recent times, large billboards are erected near highways and messages are painted on the sides of barns or other large buildings to capture the attention of passing motorists. Such large billboards present an advertisement or message in a static form. That is, the billboard is most often painted or has a previously prepared advertisement applied to it. The message remains on the sign until it is desired to replace the message with a different communication. These billboards are often illuminated during the hours of darkness in order to reach even more viewers. Such illumination is usually achieved with incandescent or other bright lights.

A need exists for large outdoor visual display signs that are capable of vivid color representation and have the ability to display moving images and that can be placed at remote locations such as on a building or a freestanding pylon.

Although visual display systems exist providing moving images in color, for example, a television show or videotape, such display signs have not provided vivid video images, especially signs that are used outdoors and especially during bright sunlight. Previous signs designed for outdoor use have been prohibitively expensive to operate, to purchase, and to maintain. Lack of brightness is a serious problem for prior outdoor display signs. Light from other sources, especially the sun and the moon, but also including, but not limited to, other lights on the ground or on adjacent buildings, reduces the ability of viewers to perceive the picture displayed by the sign. These outdoor display signs are comprised of a plurality of lighting units, some of which are turned off, and therefore black, at any particular moment, and some of which are lit in order to show the picture. Ambient light reduces the contrast of the sign in two ways. First, when a lighting unit is off, the blackness of the lighting unit is only as dark as the ambient light. Second, when a lighting unit is lit, its colors mix with the ambient light. Thus, external light washes out the picture, causing the viewer to have difficulty perceiving the picture being displayed, especially when that picture is a moving picture in color. In addition, visual display signs are often placed in high locations so that they can be seen from a distance, and the main light output is directed horizontally outward. As a result, viewers who are not directly in front of the sign, but are viewing the sign from the side as they pass by on foot or in automobiles, do not receive the most direct light output. Thus, a need exists for a lens that will increase the light output of a visual display sign in a particular desired direction.

Various methods are used to increase display sign brightness as perceived by a viewer who is not directly in the path of the light output. For example, a high-intensity light source or light bulb can be used. This solution is expensive. The lighting units can be placed at a predetermined angle to direct light output in a desired direction, such as downward toward a viewer below the sign, or a mirrored shade can be placed over the lighting unit and angled downward. None of these methods improves the delivery of light output to viewers who are not directly in front of the display sign. Thus, a need exists for a lens having a predetermined shape for the lighting units of large visual display signs. The lens should disperse the light emitted from each lighting unit of the display sign more horizontally than vertically, concentrating the emitted light in a narrow horizontal band so that, as a viewer moves away from the front of the display sign toward the side of the display sign, the displayed image remains bright and legible. The horizontal spread also avoids loss of light uselessly in the upward direction, concentrating the emitted light where it is best seen by a viewer below and/or to the side of the sign.

Numerous examples exist in the prior art of lenses having a predetermined shape in order to direct emitted light in a desirable direction or pattern. A patentability search for lenses having a predetermined shape in which the emitted light is spread further horizontally than vertically resulted in the following patents.

U.S. Pat. No. 2,853,599 discloses a lens formed from a single piece of cast glass that produces a beam of light having a horizontal width wider than its vertical height. The light-incident face of the lens has concave arcuate ridges that spread the emitted light horizontally, whereas the light-emergent face of the lens has concentric annular ridges of convergent refracting power. The ridges on the light-emergent face of the lens act to distribute the emitted light uniformly.

U.S. Pat. No. 1,671,313 discloses a lens for headlights in which the body of the lens is generally prismoidal with the base of the prism at the bottom. The light-incident and light-emitting faces of the lens are grooved to form a series of minus cylindrical lenses extending vertically. These grooves diffuse the light and spread the light horizontally.

U.S. Pat. No. 1,955,597 teaches a modified Fresnel lens that has a spherical front face and a rear face on which is formed a series of substantially semicircular refracting zones and a central bulls eye. The refracting zones on the upper half of the rear face have a different configuration from the refracting zones on the lower half of the rear face, so that the light emitted by the upper half of the lens is largely parallel and the light emitted by the lower half of the lens is spread away from the central axis.

None of the above-described patents provides a simple, inexpensive lens for spreading light evenly and horizontally so that a viewer of a visual display sign comprising the lenses is provided with bright, even illumination whether the viewer is directly in front of or is below and/or to the side of a lighting unit emitting light through the lens.

3. Solution to the Problem

Under the teachings of the present invention, a lens is disclosed that, in the first embodiment, has on its light-incident surface a plurality of vertically disposed ridges derived from a predetermined high-frequency waveform, whereas the light-emitting surface of the lens is a substantially flat surface. The high-frequency waveform is derived from a combination of a first predetermined primary waveform and the third harmonic waveform of the first primary waveform. The lens, when attached to a lighting unit for a visual display sign, spreads the emitted light about twenty degrees horizontally as measured from the planar circumference of the lens, enabling the viewer of a visual display sign comprising the lenses to perceive a bright video image whether the viewer is directly in front of or is to the side of the visual display sign, or whether ambient conditions are bright, such as outdoors in sunlight.

In a second embodiment of the lens of the present invention, the high-frequency waveform of the light-incident surface is derived from a combination of a second predetermined primary waveform and the third and fifth harmonic waveforms of the second primary waveform. The light-emitting surface is formed into a high-frequency, low-amplitude waveform, rather than being flat as in the first embodiment. This second embodiment of the lens, when attached to a lighting unit for a visual display sign, spreads the emitted light forty-five degrees horizontally as measured from the planar circumference of the lens. Both embodiments of the lenses made according to the present invention spread light emitted from the lens with graduated intensity horizontally, without any hot spots or darker areas.

SUMMARY OF THE INVENTION

The present invention comprises a lighting unit having a light source emitting light, a reflector placed behind the light source for reflecting the emitted light, and a lens held in front of the light source. The lens is largely circular. The first embodiment of the lens according to the present invention has a predetermined structure that comprises a substantially flat light-emitting surface and a light-incident surface opposing the light-emitting surface and facing the light source. The light-incident surface of the lens is formed into a high-frequency (i.e., 18 cycles per diameter) waveform. In the preferred embodiment, the high-frequency waveform is vertically oriented.

The high-frequency waveform in the first embodiment of the lens is obtained from a combination of a first primary waveform and the third harmonic of the first primary waveform and is derived from the equation $$y = 0.02\left[\sin\left(\frac{2\pi x}{0.09}\right) + 0.035\sin\left(\frac{6\pi x}{0.09}\right)\right].$$

This vertically oriented high-frequency waveform spreads the emitted light with a graduated intensity horizontally about 20 degrees as measured from the edge of the lens.

In the second embodiment of the lens, the light-emitting surface comprises a vertically oriented high-frequency (about 100 cycles per diameter), low-amplitude waveform derived from the equation $$y = 0.010\sin\left(\frac{2\pi x}{0.025}\right).$$

The light-incident surface comprises a vertically oriented high-frequency (i.e., 18 cycles per diameter), high-amplitude waveform that is obtained from a combination of a second primary waveform and the third and fifth harmonics of the second primary waveform. This high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

The combination of the vertically oriented high-frequency, low-amplitude waveform on the light-emitting surface and the vertically oriented high-frequency, high-amplitude waveform on the light-incident surface spreads the emitted light with graduated intensity horizontally about 45 degrees as measured from the edge of the lens.

BRIEF DESCRIPTION OF THE DRAWING

FIG. 2 is a front elevational view of the first embodiment of the lens of FIG. 1.

FIG. 3 is a cross-sectional view of the first embodiment of the lens of FIG. 1.

FIG. 4 is an x-y graph of the curves representing the waveforms from which the light-incident surface of the first embodiment of the lens is derived.

FIG. 8 is a front elevational view of the second embodiment of the lens of FIG. 1.

FIG. 9 is a cross-sectional view of the second embodiment of the lens of FIG. 1.

FIG. 9a shows a cross section of the lip of the lens of FIG. 9.

FIG. 10 is an enlarged cross-sectional view of the lens of FIG. 9.

DETAILED DESCRIPTION OF THE DRAWING

Figure 1:
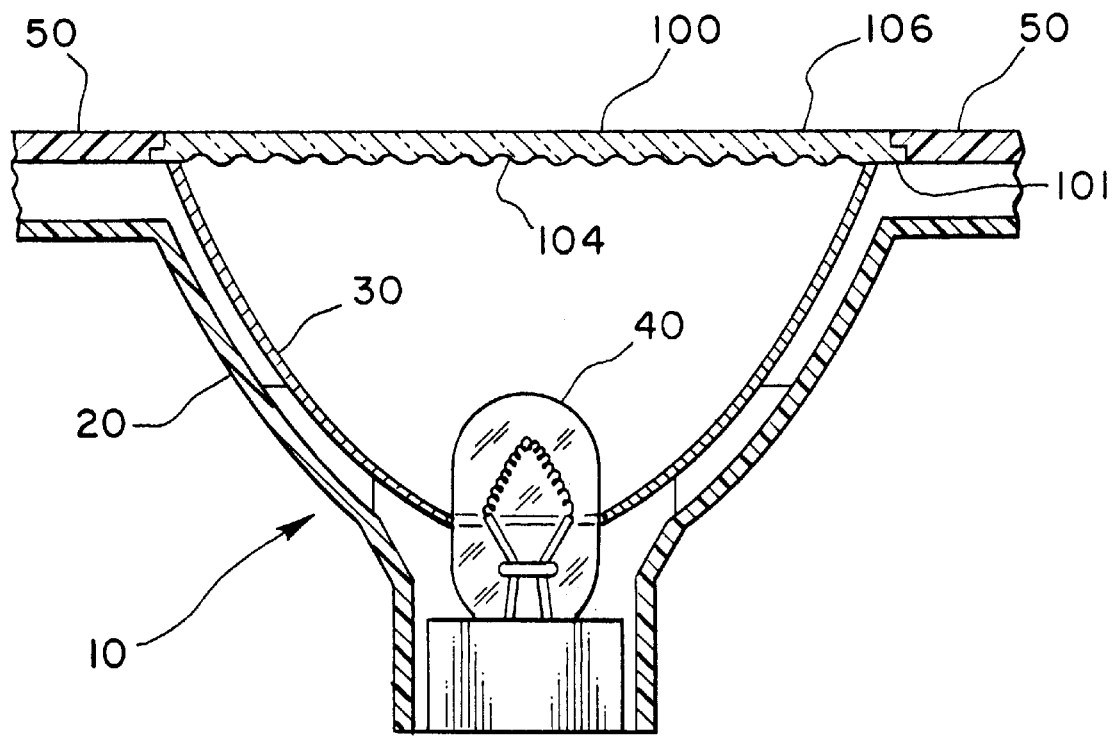
FIG. 1 is a cross-sectional view of a lighting unit comprising a lens according to the present invention.

Turning to FIG. 1, a lighting unit 10 is shown in accordance with the most preferred embodiment of the present invention. The lighting unit 10 comprises a shroud 20 within which is located a reflector 30. An incandescent light source 40 is located within the reflector 30. A lens 100 is placed in front of the light source 40. The lens 100 is held in place by a bezel 50 surrounding the reflector 30. It is to be understood that the advantages described herein are not limited to use of the lens 100 with any particular type of light source 40 or lighting unit 10.

The lens 100 can be transparent or colored as desired by the particular user. In the preferred embodiment, the lens 100 is made of plastic, such as that sold under the trademark LEXAN; however, it is to be understood that other materials having the necessary qualities (for example, transparency, ease of formation into a desired structure, light weight, resistance to heat, strength) and other shapes are contemplated under the teachings of the present invention, and the present invention is not meant to be limited by any particular description found herein. For the purposes of orientation, a vertical diameter 102 is designated as shown in FIG. 2. It is to be understood that the lens 100 is symmetrical about the vertical diameter 102.

The configuration of the lens 100 in the first embodiment is illustrated in FIGS. 2 and 3. FIG. 2 is a front view of the lens 100. The lens 100 is largely circular, having an edge 110 delimited by the circumference. A lip 101 surrounds the edge 110. The lens 100 is oriented in FIG. 2 as a viewer would normally view the lens 100. That is, as a viewer faces the lens 100, the bottom of the lens 100 is at 107 and the top of the lens 100 is at 109.

The lens 100 comprises a light-incident surface 104 facing the incandescent bulb 40, as can be seen in FIGS. 1 and 3. Opposing the light-incident surface 104 is a light-emitting surface 106. The light-emitting surface 106 is, in the preferred embodiment, a substantially flat planar surface. However, the light-emitting surface 106 can also comprise a very low frequency waveform as discussed in greater detail below.

The light-incident surface 104 of the lens 100 comprises a plurality of smooth ridges 108 having a predetermined configuration and extending substantially parallel to the vertical diameter 102 as shown in FIG. 2. The predetermined configuration of the ridges 108 in the first embodiment is a high-frequency (i.e., about 18 cycles over the diameter of the lens) waveform derived from the combination of a first primary waveform and the third harmonic waveform of the first primary waveform. The first primary waveform is described by the equation:

$$y = 0.02\sin\left(\frac{2\pi x}{0.09}\right) \quad \text{(equation 1)}$$

The combination waveform of the first embodiment is described by the equation:

$$y = 0.02\left[\sin\left(\frac{2\pi x}{0.09}\right) + 0.035\left(\frac{6\pi x}{0.09}\right)\right] \quad \text{(equation 2)}$$

The curves generated by equation 1 and equation 2 are illustrated in FIG. 4. The curves are exaggerated in FIG. 4 for ease of viewing. Curve A illustrates the primary waveform that results from equation 1, while Curve B illustrates the combination waveform of the first embodiment that results from combining the primary waveform of equation 1 with the third harmonic of the primary waveform.

Although in the preferred embodiment illustrated in this application the waveforms discussed are derived from sine-wave waveforms, it is to be understood that other types of waveforms as known by those skilled in the art could be used in the present invention. For example, waveforms derived from alternating circles or parabolas, or even waveforms derived from arbitrary coordinates forming a repeating wave, could be used to generate the light-incident surface 104.

When light emitted by the light source 40 or reflected from the reflector 30 passes through the first embodiment of the lens 100, the light strikes the vertically oriented ridges 108 on the light-incident surface 104 of the lens and then passes through the lens 100 and is emitted from the light-emitting surface 106. The vertically oriented ridges 108 formed by the combination waveform described by equation 2 cause the light passing through the light-incident surface 104 to be emitted from the light-emitting surface 106 of the lens 100 in a predetermined direction, as shown in FIG. 5.

Figure 5:
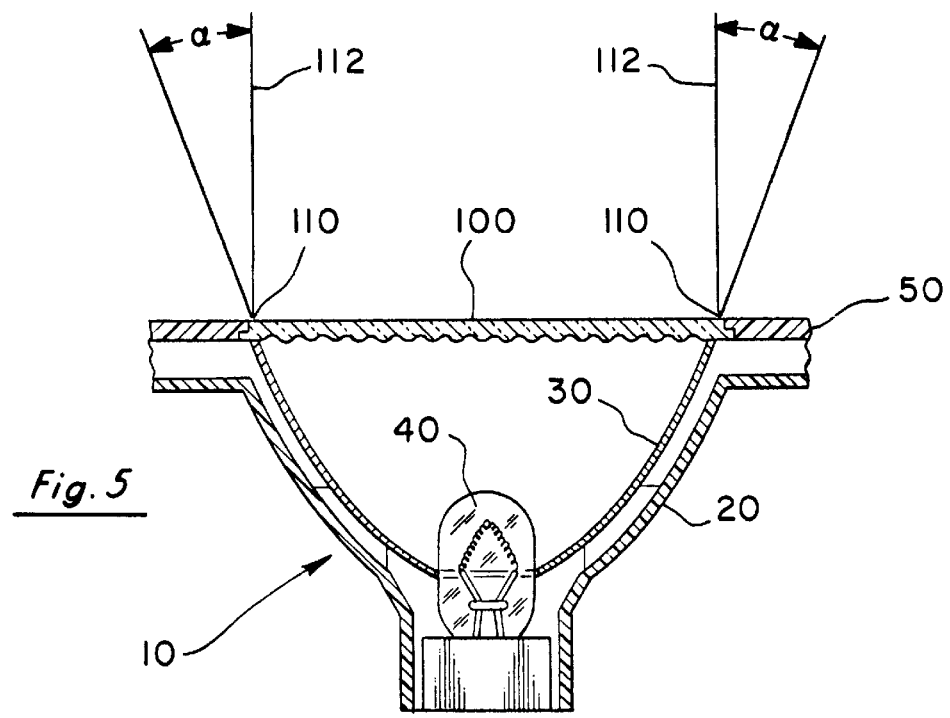
FIG. 5 is a cross-sectional view of the lighting unit incorporating the first embodiment of the lens according to the present invention showing the angle to which the light emitted through the lens is spread.

In FIG. 5, the lens 100 is shown attached to a lighting unit 10 containing a light source 40. The edge 110 of the circular lens 100 delimits a plane of circumference 112 extending outward from the circumference. The light emitted from the lens 100 spreads beyond the plane of circumference 112 of the lens 100 by a predetermined angle a. In the first embodiment of the present invention, angle α is approximately twenty degrees (20°).

Figure 6:
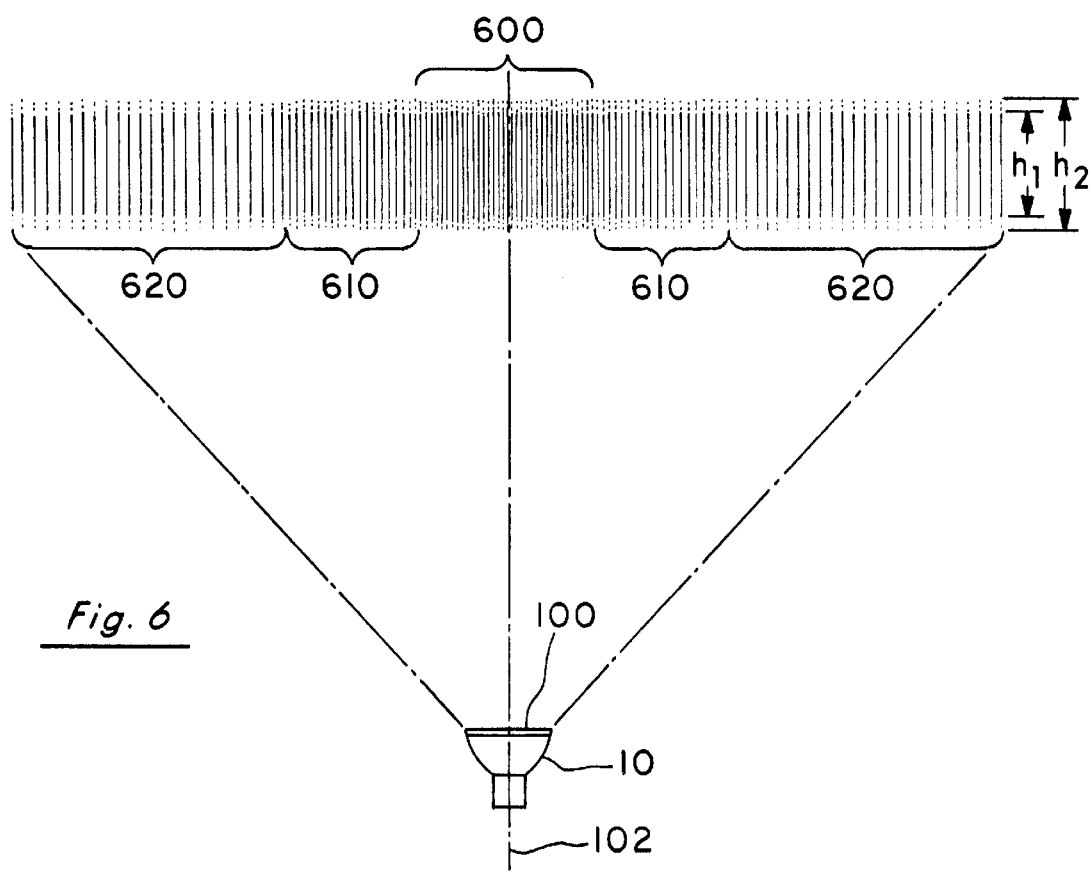
FIG. 6 is a cross-sectional view of the lighting unit incorporating the lens according to the present invention showing the graduated intensity of the emitted light.

As a result of the vertical orientation of the ridges 108 on the light-incident surface 104, the light is spread substantially more horizontally than vertically and without side-lobe hot spots, as shown in FIG. 6. In other words, and as shown in FIG. 6, the lens 100 spreads the emitted light with graduated intensity over the horizontal area. (In this specification, the word "graduated" is defined as "to change gradually.") That is, the center area 600 has the brightest (or greatest) intensity. Areas 610 have the next greatest intensity, and areas 620 have the least intensity. Importantly, the greatest intensity (area 600) only appears in the center and the intensity gradually decreases through areas 610 and 620. There are no distinct dividing lines between areas 600, 610, and 620.

Thus, for visual display signs having a plurality of lighting units 10 emitting light through the lens 100 according to the first embodiment of the present invention, the substantially horizontal spread (approximately 20 degrees) of emitted light with graduated intensity and without side-lobe hot spots beyond the plane of circumference 112 of the lens 100 increases the delivery and quality of light to a viewer who is not situated directly in front of the lighting unit 10 but rather may be located to one or the other side. The substantially horizontal uniform spread achieved by the lens 100 also decreases the amount of light that is directed to unwanted locations, that is, less light is directed upward with respect to a viewer below the display sign.

Should a more vertical spread of the emitted light be desired, however, this can be attained by the lens 100 having a light-incident surface 104 with vertically oriented ridges 108 as described above for the preferred embodiment but also having a light-emitting surface 106 that comprises a very low frequency waveform orthogonal to the high-frequency waveform comprising the rear surface 104. That is, the very low frequency waveform (i.e., about one cycle over the diameter of the lens) on the light-emitting surface 106 is oriented horizontally with respect to the vertical orientation of the high-frequency waveform (i.e., about 18 cycles over the diameter of the lens) on the light-incident surface 104. For example, a waveform as described above is produced by the equation $$y = 0.02\sin\left(\frac{2\pi x}{1.8}\right).$$

Figure 7:
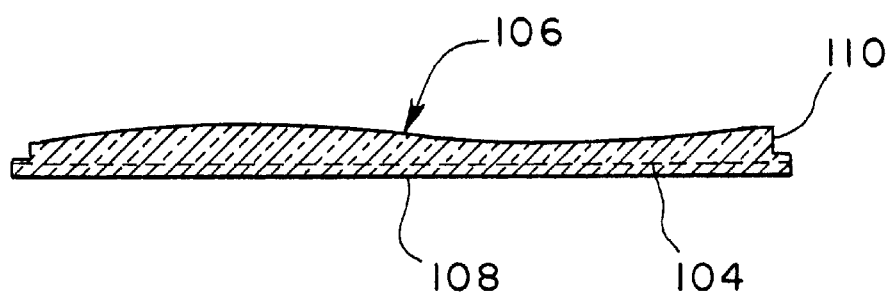
FIG. 7 is a cross-sectional view of the first embodiment of the lens along line 7—7 of FIG. 2.

Such a lens 100 is illustrated in FIG. 7. The horizontal orientation of the very low frequency waveform comprising the light-emitting surface 106 of the lens 100 spreads the emitted light substantially vertically as the light passes through the light-emitting surface 106. FIG. 6 illustrates the increase in vertical spread from $h_1$ (the light-emitting surface 106 is substantially flat) to $h_2$ (the light-emitting surface 106 is formed into the very low frequency waveform). It is to be understood that the vertical spread increase illustrated in FIG. 6 is just an example, and that any number of different waveforms can be used to provide any desired amount of vertical spread in the lens of the present invention.

A second embodiment of the lens 200 is illustrated in FIGS. 8 and 9. For the purposes of orientation, a vertical diameter 202 is designated as shown in FIG. 8. It is to be understood that the lens 200 is symmetrical about the vertical diameter 202. FIG. 8 is a front view of the lens 200. In the second embodiment, the lens 200 is largely circular and has an edge 210 delimited by the circumference. A segmented lip 201 extends along portions of the edge 210 and comprises two flanges 214. A cross-sectional view of the lip 201 is shown in FIG. 9a. The lens 200 is oriented in FIG. 8 as a viewer would normally view the lens 200. Hence, as a viewer faces the lens 200, the bottom of the lens 200 is at 207 and the top of the lens 200 is at 209.

The second embodiment of the lens 200 comprises a light-incident surface 204 facing the incandescent bulb 40, as shown in FIG. 9. Opposing the light-incident surface 204 is a light-emitting surface 206.

The light-incident surface 204 of the lens 200 comprises a plurality of ridges 208 and valleys 218 having a predetermined configuration and extending substantially parallel to the vertical diameter 202 as shown in FIG. 8. The predetermined configuration of the ridges 208 and valleys 218 in the second embodiment is a high-frequency (i.e., about 25 cycles over the diameter of the lens), high-amplitude waveform derived from the combination of a second primary waveform and the third and fifth harmonic waveforms of the second primary waveform. The primary waveform is described by the equation:

$$y = 0.0085 \sin\left(\frac{2\pi x}{0.075}\right) \quad \text{(equation 3)}$$

The combination waveform of the second embodiment according to the present invention is described by the equation:

$$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right] \quad \text{(equation 4)}$$

The light-emitting surface 206 of the lens 200 also comprises a plurality of ridges 216 having a predetermined configuration and extending substantially parallel to the vertical diameter 202, as shown in FIGS. 8 and 9. The predetermined configuration of the ridges 216 on the light-emitting surface 206 comprises a low-amplitude, high-frequency (i.e., about 75 cycles over a diameter) primary waveform derived from the equation:

$$y = 0.0010 \sin\left(\frac{2\pi x}{0.025}\right) \quad \text{(equation 5)}$$

FIG. 10 is an enlarged view of the indicated portion of FIG. 9 showing the detailed shapes of the ridges 208 and valleys 218 generated by equation 4 and the ridges 216 generated by equation 5. The ridges 208 and valleys 218 generated by equation 4 on the light-incident surface 204 have a repeating, high-frequency, high-amplitude waveform (the primary waveform) overlaid with a repeating, higher-frequency, low-amplitude waveform (the third and fifth harmonic waveforms). As shown in FIG. 10, this results in each ridge 208 having two peaks 210, and each valley 218 having two subvalleys 220. The primary waveform has a frequency of about 25 cycles over the diameter of the lens, whereas the third and fifth harmonic waveforms have a frequency of about 100 cycles over the diameter of the lens.

The ridges 216 generated by equation 5 on the light-emitting surface 206 have a primary waveform with a lower amplitude (i.e., about one-eighth that of the primary waveform of the light-incident surface 204) and a higher frequency (i.e., about 75 cycles over the diameter of the lens) than the primary waveform of the light-incident ridges 208.

Figure 11:
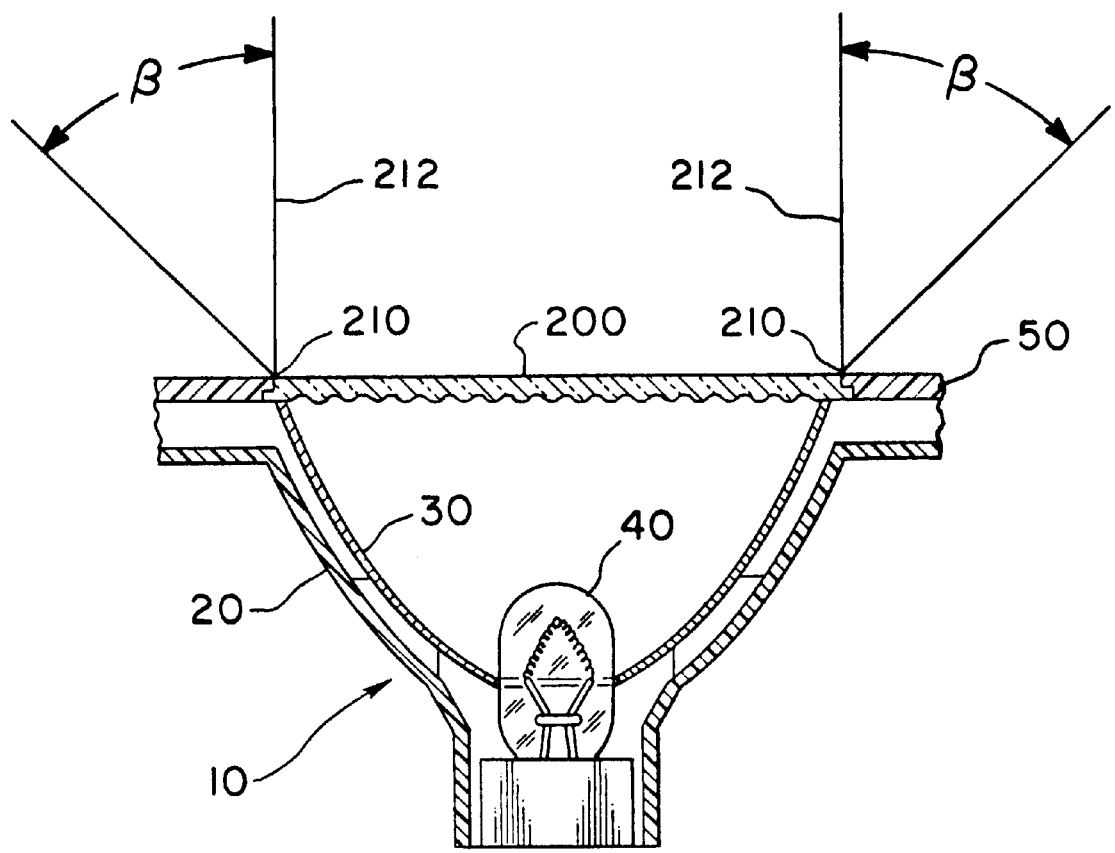
FIG. 11 is a cross-sectional view of the lighting unit incorporating the second embodiment of the lens showing the angle to which the light emitted through the lens is spread.

In FIG. 11, the lens 200 is shown attached to a lighting unit 10 containing a light source 40. The edge 210 of the circular lens 200 delimits a plane of circumference 212 extending outward from the circumference. The light emitted from the lens 200 spreads beyond the plane of circumference 212 of the lens 200 by a predetermined angle β. In the second embodiment of the present invention, angle β is approximately forty-five degrees (45°). The intensity of the light emitted by the lens 200 of the second embodiment of the present invention is graduated over the forty-five degree spread, as shown in FIG. 6, in the same manner as described above for the lens 100 of the first embodiment.

As a result of the graduated intensity of the emitted light over the horizontal area provided by the lenses 100, 200 according to the first and second embodiments described herein, the viewer of visual display signs comprising the lenses 100, 200 will continue to receive a high light output as the viewer moves from the center of the display sign toward the edges of the display sign, and the brightness and clarity of the moving picture being displayed by the visual display sign will be maintained over a wide range of viewer positions with respect to the sign. Each lens 100, 200 is appropriate to different physical locations. For example, visual display signs having the first lens 100, providing a horizontal spread of about 20 degrees, could be advantageously located along highways. Visual display signs having the second lens 200, providing a horizontal spread of about 45 degrees, could be located in stadiums or on buildings where pedestrians are common. It is to be understood that these locations are only meant to be examples and that the present invention is not limited to the uses described herein.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A lighting unit, said lighting unit comprising:
   a light source emitting light;
   a reflector behind and around said light source for reflecting said emitted light; and
   a lens in front of said light source, said lens having a diameter and an edge, said light emitted from said light source and reflected from said reflector passing through said lens, said lens comprising:
   (a) a substantially flat light-emitting surface; and
   (b) a light-incident surface opposing said substantially flat light-emitting surface, said light-incident surface of said lens comprising a vertically oriented high-frequency waveform, said high-frequency waveform having a frequency in a range between about 18 cycles and about 100 cycles over the diameter of said lens.

2. The lighting unit of claim 1 wherein said high-frequency waveform is a combination of a first primary waveform and the third harmonic of said first primary waveform.

3. The lighting unit of claim 2 wherein said high-frequency waveform is derived from the equation $$y = 0.02\left[\sin\left(\frac{2\pi x}{0.09}\right) + 0.035\sin\left(\frac{6\pi x}{0.09}\right)\right].$$

4. The lighting unit of claim 3 wherein said lens spreads said emitted light horizontally approximately 20 degrees from said edge of said lens.

5. The lighting unit of claim 4 wherein said lens spreads said emitted light with a graduated intensity over said approximately 20-degree spread.

6. The lighting unit of claim 1 wherein said high-frequency waveform is a combination of a second primary waveform and the third and fifth harmonics of said second primary waveform.

7. The lighting unit of claim 6 wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

8. The lighting unit of claim 7 wherein said light-emitting surface comprises a high-frequency, low-amplitude waveform.

9. The lighting unit of claim 8 wherein said high-frequency, low-amplitude waveform is derived from the equation $$y = 0.0010\sin\left(\frac{2\pi x}{0.025}\right).$$

10. The lighting unit of claim 9 wherein said lens spreads said emitted light horizontally approximately 45 degrees from said edge of said lens.

11. The lighting unit of claim 10 wherein said lens spreads said emitted light with a graduated intensity over said approximately 45-degree spread.

12. A lighting unit for a visual display sign, said lighting unit comprising:
   a light source emitting light;
   a reflector behind said light source for reflecting said emitted light; and
   a lens placed in front of said reflector, said lens having an edge, said light emitted from said light source and reflected from said reflector passing through said lens, said lens further comprising:
      a light-emitting surface; and
      a light-incident surface opposing said light-emitting surface, said light-incident surface comprising a high-frequency waveform, said high-frequency waveform comprising at least a primary waveform and the third harmonic of said primary waveform.

13. The lighting unit of claim 12 wherein said light-emitting surface comprises a low-frequency waveform orthogonal to said high-frequency waveform.

14. The lighting unit of claim 12 wherein said high-frequency waveform comprises a first primary waveform and the third harmonic of said first primary waveform, and wherein said high-frequency waveform is derived from the equation $$y = 0.02\left[\sin\left(\frac{2\pi x}{0.09}\right) + 0.035\sin\left(\frac{6\pi x}{0.09}\right)\right].$$

15. The lighting unit of claim 14 wherein said lens spreads said emitted light horizontally at an angle of approximately 20 degrees from said edge of said lens.

16. The lighting unit of claim 15 wherein said lens spreads said emitted light with a graduated intensity over said approximately 20-degree spread.

17. The lighting unit of claim 12 wherein said high-frequency waveform comprises a second primary waveform and the third and fifth harmonics of said second primary waveform, and wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

18. The lighting unit of claim 17 wherein said light-emitting surface comprises a high-frequency, low-amplitude waveform.

19. The lighting unit of claim 18 wherein said high-frequency, low-amplitude waveform is derived from the equation $$y = 0.0010\sin\left(\frac{2\pi x}{0.025}\right).$$

20. The lighting unit of claim 19 wherein said lens spreads said emitted light horizontally at an angle of approximately 45 degrees from said edge of said lens.

21. The lighting unit of claim 20 wherein said lens spreads said emitted light with graduated intensity over said approximately 45-degree spread.

22. A lighting unit for a visual display sign, said lighting unit comprising:
   a light source emitting light;
   a reflector behind said light source for reflecting said emitted light; and
   a lens placed in front of said reflector, said lens having an edge, said light emitted from said light source and reflected from said reflector passing through said lens, said lens further comprising:
      a substantially flat light-emitting surface; and
      a light-incident surface opposing said light-emitting surface, said light-incident surface of said lens comprising a high-frequency waveform formed from a combination of a primary waveform and the third harmonic of said primary waveform, said high-frequency waveform derived from the equation $$y = 0.02\left[\sin\left(\frac{2\pi x}{0.09}\right) + 0.035\sin\left(\frac{6\pi x}{0.09}\right)\right].$$

23. The lighting unit of claim 22 wherein said light-emitting surface comprises a low-frequency waveform orthogonal to said combination waveform.

24. The lighting unit of claim 22 wherein said high-frequency waveform spreads said emitted light horizontally at an angle of approximately 20 degrees from said edge of said lens.

25. The lighting unit of claim 24 wherein said high-frequency waveform spreads said emitted light with a graduated intensity over said approximately 20-degree spread.

26. A lighting unit for a visual display sign, said lighting unit comprising:
   a light source emitting light;
   a reflector behind said light source for reflecting said emitted light; and
   a lens placed in front of said reflector, said lens having an edge, said light emitted from said light source and reflected from said reflector passing through said lens, said lens further comprising:
      a light-emitting surface comprising a low-frequency waveform derived from the equation;

$$y = 0.0010\sin\left(\frac{2\pi x}{0.025}\right);$$

and a light-incident surface opposing said light-emitting surface, said light-incident surface of said lens comprising a high-frequency waveform formed from a combination of a primary waveform and the third and fifth harmonics of said primary waveform, said high-frequency waveform derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

27. The lighting unit of claim 26 wherein said lens spreads said emitted light horizontally at an angle of approximately 45 degrees from said edge of said lens.

28. The lighting unit of claim 27 wherein said lens spreads said emitted light with a graduated intensity over said approximately 45-degree spread.

29. A lens having an edge, said lens comprising:
a light-emitting surface; and
a light-incident surface opposing said light-emitting surface, said light-incident surface of said lens comprising a high-frequency waveform;
said high frequency waveform comprising at least a primary waveform and the third harmonic of said primary waveform; said high-frequency waveform being vertically oriented for spreading said emitted light horizontally with a graduated intensity at least approximately 20 degrees from said edge of said lens.

30. The lens of claim 29 wherein said high-frequency waveform is derived from the equation $$y = 0.02\left[\sin\left(\frac{2\pi x}{0.09}\right) + 0.035\sin\left(\frac{6\pi x}{0.09}\right)\right].$$

31. The lens of claim 30 wherein said light-emitting surface is substantially flat.

32. The lens of claim 30 wherein said light-emitting surface comprises a low-frequency, low-amplitude waveform orthogonal to said high-frequency waveform.

33. The lens of claim 29 wherein said high-frequency waveform comprises said primary waveform and said third harmonic and further comprises the fifth harmonic of said primary waveform.

34. The lens of claim 33 wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

35. The lens of claim 34 wherein said light-emitting surface comprises a high-frequency, low-amplitude, vertically oriented waveform.

36. The lens of claim 35 wherein said high-frequency, low-amplitude waveform of said light-emitting surface is derived from the equation $$y = 0.010\sin\left(\frac{2\pi x}{0.025}\right).$$

37. The lens of claim 36 wherein said high-frequency waveform spreads said emitted light horizontally at an angle of approximately 45 degrees from said edge of said lens.

38. A lens having an edge, said lens comprising:
a substantially flat light-emitting surface; and
a light-incident surface opposing said light-emitting surface, said light-incident surface of said lens comprising a high-frequency waveform derived from the equation $$y = 0.02\left[\sin\left(\frac{2\pi x}{0.09}\right) + 0.035\sin\left(\frac{6\pi x}{0.09}\right)\right],$$

said high-frequency waveform further being vertically oriented;
said lens spreading said emitted light horizontally with a graduated intensity approximately 20 degrees from said edge of said lens.

39. The lens of claim 38 wherein said light-emitting surface comprises a low-frequency waveform orthogonal to said high-frequency waveform.

40. A lens having an edge, said lens comprising:
a light-emitting surface, said light-emitting surface comprising a vertically oriented high-frequency, low-amplitude waveform derived from the equation $$y = 0.0010\sin\left(\frac{2\pi x}{0.025}\right);$$

and
a light-incident surface opposing said light-emitting surface, said light-incident surface of said lens comprising a vertically oriented high-frequency waveform derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right];$$

said lens spreading said emitted light horizontally with a graduated intensity approximately 45 degrees from said edge of said lens.

41. A lighting unit, said lighting unit comprising:
a light source emitting light;
a reflector behind and around said light source for reflecting said emitted light; and
a lens in front of said light source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;
wherein said high-frequency waveform is a combination of a first primary waveform and the third harmonic of said first primary waveform.

42. A lighting unit, said lighting unit comprising:
a light source emitting light;
a reflector behind and around said light source for reflecting said emitted light; and
a lens in front of said light source, said lens having a diameter and an edge, said light emitted from said light source and reflected from said reflector passing through said lens, said lens comprising:

(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a first primary waveform and the third harmonic of said first primary waveform;

and wherein said high-frequency waveform is derived from the equation $$y = 0.02\left[\sin\left(\frac{2\pi x}{0.09}\right) + 0.035\sin\left(\frac{6\pi x}{0.09}\right)\right].$$

43. A lighting unit, said lighting unit comprising:

a light source emitting light;

a reflector behind and around said light source for reflecting said emitted light; and a lens in front of said lights source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a first primary waveform and the third harmonic of said first primary waveform;

and wherein said high-frequency waveform is derived from the equation $$y = 0.02\left[\sin\left(\frac{2\pi x}{0.09}\right) + 0.035\sin\left(\frac{6\pi x}{0.09}\right)\right];$$

and wherein said lens spreads said emitted light horizontally approximately 20 degrees from said edge of said lens.

44. A lighting unit, said lighting unit comprising:

a light source emitting light;

a reflector behind and around said light source for reflecting said emitted light; and a lens in front of said light source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a first primary waveform and the third harmonic of said first primary waveform;

and wherein said high-frequency waveform is derived from the equation $$y = 0.02\left[\sin\left(\frac{2\pi x}{0.09}\right) + 0.035\sin\left(\frac{6\pi x}{0.09}\right)\right];$$

and wherein said lens spreads said emitted light horizontally approximately 20 degrees from said edge of said lens;

and wherein said lens spreads said emitted light with a graduated intensity over said approximately 20-degree spread.

45. A lighting unit, said lighting unit comprising:

a light source emitting light;

a reflector behind and around said light source for reflecting said emitted light; and a lens in front of said light source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary waveform.

46. A lighting unit, said lighting unit comprising:

a light source emitting light;

a reflector behind and around said light source for reflecting said emitted light; and a lens in front of said light source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary waveform;

and wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right].$$

47. A lighting unit, said lighting unit comprising:

a light source emitting light;

a reflector behind and around said light source for reflecting said emitted light; and a lens in front of said light source, said lens having a diameter and an edge, said light emitted from said light source and reflected from said reflector passing through said lens, said lens comprising:
(a) a light-emitting surface; and
(b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary wave-form;

and wherein said high-frequency waveform is derived from the equation;

$$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right];$$

and wherein said light-emitting surface comprises a high-frequency, low-amplitude waveform.

48. A lighting unit, said lighting unit comprising:
a light source emitting light;
a reflector behind and around said light source for reflecting said emitted light; and
a lens in front of said light source, said lens having a diameter and an edge, said light emitted from said light source and reflected from said reflector passing through said lens, said lens comprising:
  (a) a light-emitting surface; and
  (b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary wave-form;

and wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right];$$

and wherein said light-emitting surface comprises a high-frequency, low-amplitude waveform;

and wherein said high-frequency, low-amplitude waveform is derived from the equation $$y = 0.0010\sin\left(\frac{2\pi x}{0.025}\right).$$

49. A lighting unit, said lighting unit comprising:
a light source emitting light;
a reflector behind and around said light source for reflecting said emitted light; and
a lens in front of said light source, said lens having a diameter and an edge, said light emitted from said light source and reflected from said reflector passing through said lens, said lens comprising:
  (a) a light-emitting surface; and
  (b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary waveform;

and wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right];$$

and wherein said light-emitting surface comprises a high-frequency, low-amplitude waveform;

and wherein said high-frequency, low-amplitude waveform is derived from the equation $$y = 0.0010\sin\left(\frac{2\pi x}{0.025}\right);$$

and wherein said lens spreads said emitted light horizontally approximately 45 degrees from said edge of said lens.

50. A lighting unit, said lighting unit comprising:
a light source emitting light;
a reflector behind and around said light source for reflecting said emitted light; and
a lens in front of said light source, said lens having a diameter and an edge, said light emitted from said light source and reflected from said reflector passing through said lens, said lens comprising:
  (a) a light-emitting surface; and
  (b) a light-incident surface opposing said light-emitting surface, said light-incident surface of said lens comprising a vertically oriented high-frequency waveform, said high-frequency waveform having a frequency in a range between about 18 cycles and about 100 cycles over the diameter of said lens;

wherein said high-frequency waveform is a combination of a second primary waveform and the third and fifth harmonics of said second primary waveform;

and wherein said high-frequency waveform is derived from the equation $$y = 0.0085\left[\sin\left(\frac{2\pi x}{0.075}\right) + 0.3\sin\left(\frac{6\pi x}{0.075}\right) - 0.06\sin\left(\frac{10\pi x}{0.075}\right)\right];$$

and wherein said light-emitting surface comprises a high-frequency, low-amplitude waveform;

and wherein said high-frequency, low-amplitude waveform is derived from the equation $$y = 0.0010\sin\left(\frac{2\pi x}{0.025}\right);$$

and wherein said lens spreads said emitted light horizontally approximately 45 degrees from said edge of said lens;

and wherein said lens spreads said emitted light with a graduated intensity over said approximately 45-degree spread.

* * * * *